US011005946B2

(12) United States Patent
Sato et al.

(10) Patent No.: US 11,005,946 B2
(45) Date of Patent: *May 11, 2021

(54) NON-TRANSITORY STORAGE MEDIUM STORING INSTRUCTIONS FOR CREATING TWO-DIMENSIONAL-CODE

(71) Applicant: Brother Kogyo Kabushiki Kaisha, Nagoya (JP)

(72) Inventors: Hirotaka Sato, Nagoya (JP); Susumu Fujiwara, Nagoya (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/178,975

(22) Filed: Nov. 2, 2018

(65) Prior Publication Data

US 2019/0132402 A1    May 2, 2019

(30) Foreign Application Priority Data

Nov. 2, 2017 (JP) .............................. JP2017-212672

(51) Int. Cl.
*H04L 29/08* (2006.01)
*G06K 19/06* (2006.01)
*H04L 29/12* (2006.01)

(52) U.S. Cl.
CPC ...... *H04L 67/146* (2013.01); *G06K 19/06037* (2013.01); *H04L 61/30* (2013.01);
(Continued)

(58) Field of Classification Search
CPC ......... H04L 61/00; H04L 61/10; H04L 61/30; H04L 61/301; H04L 61/60;
(Continued)

(56) References Cited

U.S. PATENT DOCUMENTS

| 6,583,799 B1 * | 6/2003 | Manolis | H04N 1/00204 715/838 |
| 8,807,434 B1 * | 8/2014 | Windmueller | G06K 19/06037 235/462.09 |

(Continued)

FOREIGN PATENT DOCUMENTS

| JP | 2006-301919 A | 11/2006 |
| JP | 2007-304652 A | 11/2007 |

*Primary Examiner* — Boris D Grijalva Lobos
(74) *Attorney, Agent, or Firm* — Banner & Witcoff, Ltd.

(57) ABSTRACT

A non-transitory storage medium stores instructions readable by a computer of an information processing apparatus. The information processing apparatus includes an accepter configured to accept an operation of a user. When executed by the computer, the instructions cause the information processing apparatus to perform: executing an accepting processing in which the accepter of the information processing apparatus accepts a selecting operation that is an operation of selecting data; executing an obtaining processing in which the information processing apparatus obtains a URL corresponding to data specified by the selecting operation accepted in the accepting processing; and executing a creating processing in which the information processing apparatus creates a two-dimensional code storing the URL obtained in the obtaining processing.

6 Claims, 9 Drawing Sheets

(52) U.S. Cl.
CPC .............. *H04L 67/02* (2013.01); *H04L 67/06* (2013.01); *H04L 67/1097* (2013.01)

(58) Field of Classification Search
CPC ..... H04L 61/6072; H04L 67/00; H04L 67/02; H04L 67/06; H04L 67/1097; H04L 67/12; H04L 67/146; G06K 19/00; G06K 19/04; G06K 19/041; G06K 19/06009; G06K 19/06037; G06Q 30/00; G06Q 30/06; G06Q 30/0601
See application file for complete search history.

(56) References Cited

U.S. PATENT DOCUMENTS

| | | | | |
|---|---|---|---|---|
| 8,965,844 | B2* | 2/2015 | Jin | G06F 16/00 707/610 |
| 9,286,295 | B2* | 3/2016 | Beadles | H04L 67/02 |
| 9,298,935 | B1* | 3/2016 | Kumar | G06F 21/6272 |
| 9,928,632 | B1* | 3/2018 | Barnum | G06T 11/60 |
| 10,063,620 | B2* | 8/2018 | Lin | H04L 65/403 |
| 2002/0078102 | A1* | 6/2002 | Dutta | G06F 16/972 715/205 |
| 2002/0116531 | A1* | 8/2002 | Chu | G06Q 30/02 709/246 |
| 2005/0052695 | A1* | 3/2005 | Fukunaga | H04N 1/00244 358/1.15 |
| 2007/0187508 | A1* | 8/2007 | Takayama | G06K 19/06037 235/462.01 |
| 2007/0208708 | A1* | 9/2007 | Altounian | G06Q 30/06 |
| 2008/0147710 | A1* | 6/2008 | Naam | G06F 16/958 |
| 2011/0113340 | A1* | 5/2011 | Miyazawa | G06F 9/445 715/736 |
| 2012/0066613 | A1* | 3/2012 | Berger | G06Q 30/01 715/751 |
| 2012/0084131 | A1* | 4/2012 | Bergel | G06Q 20/40 705/14.26 |
| 2012/0197886 | A1* | 8/2012 | Saitou | G06F 16/9554 707/736 |
| 2012/0284099 | A1* | 11/2012 | Dixon | G06Q 30/02 705/14.16 |
| 2013/0013699 | A1* | 1/2013 | Huxley | G06Q 10/101 709/206 |
| 2013/0018726 | A1* | 1/2013 | Ionescu | G06Q 30/00 705/14.49 |
| 2013/0043302 | A1* | 2/2013 | Powlen | G06F 16/381 235/375 |
| 2013/0054675 | A1* | 2/2013 | Jenkins | G06F 16/954 709/203 |
| 2013/0074191 | A1* | 3/2013 | Ben-Reuven | G06F 21/6209 726/26 |
| 2013/0103797 | A1* | 4/2013 | Park | H04L 65/60 709/217 |
| 2013/0211970 | A1* | 8/2013 | Glass | G06Q 30/0641 705/27.1 |
| 2013/0282714 | A1* | 10/2013 | Lathrom | G06F 16/955 707/736 |
| 2014/0058938 | A1* | 2/2014 | McClung, III | G06Q 20/227 705/41 |
| 2014/0064618 | A1* | 3/2014 | Janssen, Jr. | G06F 40/211 382/182 |
| 2014/0091135 | A1* | 4/2014 | Burke, Jr. | G06Q 10/20 235/375 |
| 2014/0103108 | A1* | 4/2014 | Sun | H04L 67/02 235/375 |
| 2014/0143337 | A1* | 5/2014 | McIntosh | H04L 67/02 709/204 |
| 2014/0325328 | A1* | 10/2014 | Beadles | H04L 43/08 715/208 |
| 2014/0359069 | A1* | 12/2014 | Matute | H04W 12/08 709/218 |
| 2014/0379913 | A1* | 12/2014 | Niimura | H04L 67/34 709/225 |
| 2015/0025981 | A1* | 1/2015 | Zaretsky | G06F 16/9566 705/14.73 |
| 2015/0082386 | A1* | 3/2015 | Safa | G06F 16/116 726/4 |
| 2015/0163261 | A1* | 6/2015 | Mahkovec | G06F 21/6218 709/204 |
| 2015/0288760 | A1* | 10/2015 | Thomas | H04L 67/10 709/203 |
| 2016/0044071 | A1* | 2/2016 | Sandholm | G06Q 10/101 709/204 |
| 2016/0044122 | A1* | 2/2016 | Sandholm | H04W 4/21 709/206 |
| 2016/0048287 | A1* | 2/2016 | Lee | G06F 3/0488 715/767 |
| 2016/0171357 | A1* | 6/2016 | Kwon | H04N 1/00856 358/1.15 |
| 2016/0196484 | A1* | 7/2016 | Ciavatta | G06K 19/06037 235/462.1 |
| 2016/0212178 | A1* | 7/2016 | Zhang | H04L 65/4015 |
| 2016/0217217 | A1* | 7/2016 | Boudville | G06F 16/9554 |
| 2016/0306892 | A1* | 10/2016 | Bu | H04L 63/10 |
| 2017/0017648 | A1* | 1/2017 | Pearlman | G06K 9/46 |
| 2017/0193124 | A1* | 7/2017 | Wong, Jr. | G06K 7/10297 |
| 2017/0300793 | A1* | 10/2017 | Wang | G06K 19/06037 |
| 2018/0083959 | A1* | 3/2018 | Barbosa | H04L 63/0853 |
| 2018/0240184 | A1* | 8/2018 | Boudville | G06Q 30/0643 |
| 2018/0253502 | A1* | 9/2018 | Stone | H04L 67/306 |
| 2019/0130044 | A1* | 5/2019 | Sato | G06F 16/9577 |

* cited by examiner

NON-TRANSITORY STORAGE MEDIUM STORING INSTRUCTIONS FOR CREATING TWO-DIMENSIONAL-CODE

CROSS REFERENCE TO RELATED APPLICATION

The present application claims priority from Japanese Patent Application No. 2017-212672, which was filed on Nov. 2, 2017, the disclosure of which is herein incorporated by reference in its entirety.

BACKGROUND

The following disclosure relates to a two-dimensional-code printing system and a non-transitory storage medium storing a plurality of instructions readable by a computer of an information processing apparatus, for obtaining a uniform resource locator (URL) to create a two-dimensional code storing the obtained URL.

There is conventionally known a technique of creating a two-dimensional code storing a URL. For example, there is known a configuration for creating, from a URL of a website, a short URL associated with the URL and shorter than the URL, and creating a QR code (registered trademark) storing the short URL.

SUMMARY

When creating a two-dimensional code, a user in advance needs to designate a URL to be stored into the two-dimensional code. The designation of the URL has the following problem. Examples of a way for the user to designate the URL include: manually inputting characters of the URL one by one; and copying and pasting the URL on a web page displayed on a browser. Each method increases the number of operations of the user, unfortunately.

Accordingly, an aspect of the disclosure relates to a technique for reducing the number of operations of a user in the case where the user designates a URL to be stored into a two-dimensional code.

One aspect of the disclosure relates to a non-transitory storage medium storing a plurality of instructions readable by a computer of an information processing apparatus. The information processing apparatus includes an accepter configured to accept an operation of a user. When executed by the computer, the plurality of instructions cause the information processing apparatus to perform: executing an accepting processing in which the accepter of the information processing apparatus accepts a selecting operation that is an operation of selecting data; executing an obtaining processing in which the information processing apparatus obtains a URL (uniform resource locator) corresponding to data specified by the selecting operation accepted in the accepting processing; and executing a creating processing in which the information processing apparatus creates a two-dimensional code storing the URL obtained in the obtaining processing.

Another aspect of the disclosure relates to a non-transitory storage medium storing a plurality of instructions readable by a computer of an information processing apparatus. The information processing apparatus includes an accepter configured to accept an operation of a user. When executed by the computer, the plurality of instructions cause the information processing apparatus to perform: executing an accepting processing in which the information processing apparatus starts up a browser installed in the information processing apparatus, and the accepter of the information processing apparatus accepts selection of one web page displayed on the browser; executing an obtaining processing in which the information processing apparatus obtains, from the browser, a URL (uniform resource locator) corresponding to the web page specified by the selection accepted in the accepting processing; and executing a creating processing in which the information processing apparatus creates a two-dimensional code storing the URL obtained in the obtaining processing.

Yet another aspect of the disclosure relates to a non-transitory storage medium storing a plurality of instructions readable by a computer of an information processing apparatus. The information processing apparatus includes: an accepter configured to accept an operation of a user; and a communication interface configured to establish connection to a network. When executed by the computer, the plurality of instructions cause the information processing apparatus to perform: executing an accepting processing in which the accepter of the information processing apparatus accepts a selecting operation that is an operation of selecting an image file or a document file; executing an obtaining processing in which the information processing apparatus uploads the image file or the document file specified by the selecting operation accepted in the accepting processing, to an external server connected over the network, and obtains a URL (uniform resource locator) corresponding to an upload destination on the external server; and executing a creating processing in which the information processing apparatus creates a two-dimensional code storing the URL obtained in the obtaining processing.

In yet another aspect of the disclosure, a two-dimensional-code printing system includes an information processing apparatus and an image recording apparatus. The information processing apparatus includes a controller configured to control the information processing apparatus to perform: accepting a selecting operation that is an operation of a user for selecting data; obtaining a URL (uniform resource locator) corresponding to data specified by the accepted selecting operation; and creating a two-dimensional code storing the obtained URL. The image recording apparatus includes a recording device configured to record, on a recording medium, an image including the two-dimensional code created by the information processing apparatus.

BRIEF DESCRIPTION OF THE DRAWINGS

The objects, features, advantages, and technical and industrial significance of the present disclosure will be better understood by reading the following detailed description of the embodiment, when considered in connection with the accompanying drawings, in which.

DETAILED DESCRIPTION OF THE EMBODIMENT

Hereinafter, there will be described one embodiment of the present disclosure by reference to the drawings. A two-dimensional-code printing system according to the present embodiment includes an information processing apparatus and a printer communicable with each other.

Figure 1:
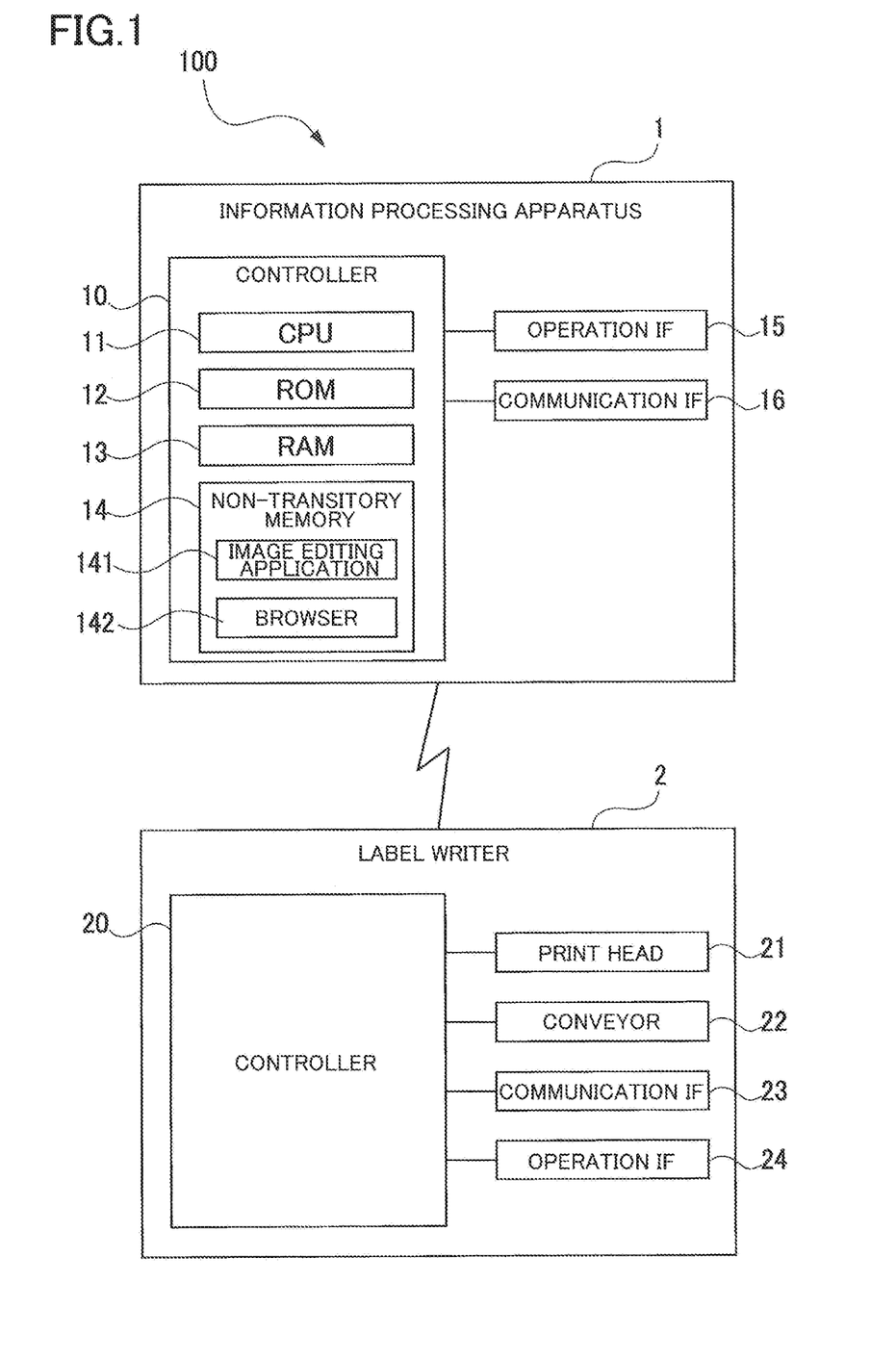
FIG. 1 is a schematic view of a two-dimensional-code printing system according to an embodiment.

As illustrated in FIG. 1, specifically, a two-dimensional-code printing system 100 includes an information processing apparatus 1 and a label writer 2 communicably connected to each other. The information processing apparatus 1 creates and edits image data, transmits the image data to the label writer 2, and instructs the label writer 2 to perform printing based on the image data, for example. Examples of the information processing apparatus 1 include a smartphone, a personal computer, and a tablet computer.

As illustrated in FIG. 1, the information processing apparatus 1 includes a controller 10 that includes a CPU 11, a ROM 12, a RAM 13, and a non-transitory memory (non-volatile memory) 14. The information processing apparatus 1 further includes an operation interface 15 and a communication interface 16 that are electrically connected to the controller 10.

The ROM 12 stores a startup program for starting up the information processing apparatus 1, for example. The RAM 13 is used as a working area when various processings are executed or as a storage area to which data is temporarily stored. The non-transitory memory 14 is, for example, a hard disk drive or a flash memory and stores various programs and data. The CPU 11 executes various processings according to the program or programs read from the ROM 12 or the non-transitory memory 14.

In the present embodiment, the non-transitory memory 14 stores an image editing application 141 that is an application program for editing an image and causing the label writer 2 to perform printing based on the edited image. The non-transitory memory 14 further stores a browser 142. The image editing application 141 is one example of a two-dimensional-code creating program. The browser 142 is a program for displaying a web page. The CPU 11 executes processings according to the image editing application 141 in response to an instruction given by a user. In the following description, the wordings "the CPU 11 executes a processing according to the image editing application 141" may be hereinafter referred to as "the image editing application 141 executes a processing" for simplicity.

The operation interface 15 is, for example, a touch screen that accepts an input from the user and displays information. The operation interface 15 is one example of an accepter. The information processing apparatus 1 may include a keyboard, a mouse, a display, and other similar devices instead of the operation interface 15.

Figure 2:
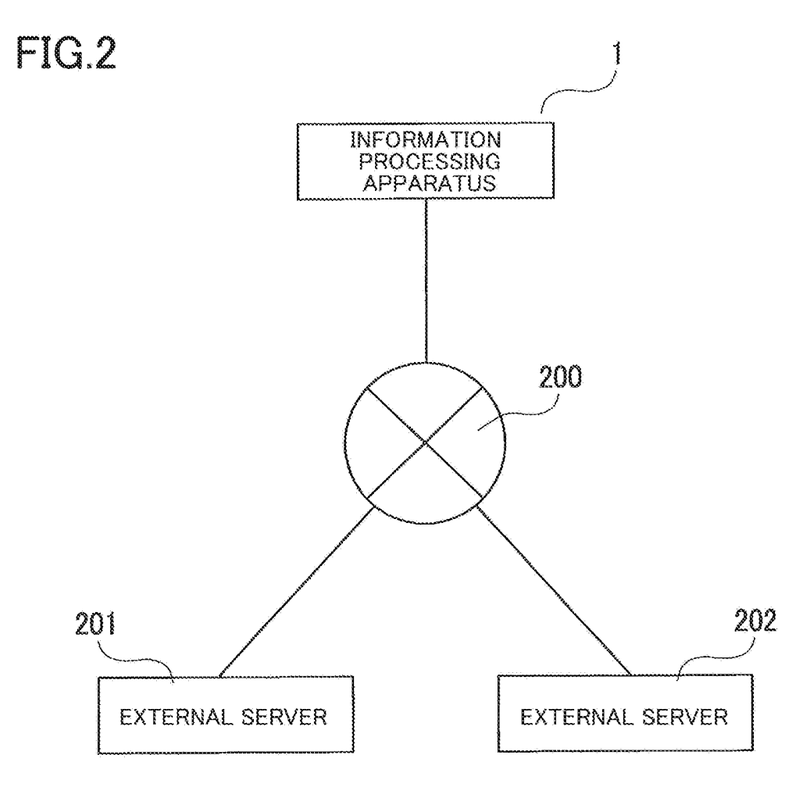
FIG. 2 is a view illustrating an example of a configuration for communication between an information processing apparatus and external servers.

The communication interface 16 is hardware for communicating with external devices connected to the information processing apparatus 1 over a network. As illustrated in FIG. 2, the information processing apparatus 1 is connected to the Internet 200 via the communication interface 16. An external server 201 and an external server 202 are connected to the Internet 200, for example. The external server 201 is a device on the network which is capable of storing image files. The external server 202 is a device on the network which performs service of searching for a web page. The external server 201 and the external server 202 may be configured as one unit. Each of the external servers will be described later in detail.

The communication interface 16 includes hardware for communication with the label writer 2. The communication interface 16 connected to the Internet 200 and the communication interface 16 for communicating with the label writer 2 may be independent of each other. The communication interface 16 may use various communication standards such as a USB and a LAN. Also, the communication may be performed wirelessly or wiredly.

In the present embodiment, the label writer 2 is a device configured to produce a label by thermal-transfer printing on a print tape that is a continuous strip-shaped recording medium. The label writer 2 is one example of a printer. It is noted that the printer is not limited to the label writer. The printing method is not limited to the thermal-transfer method and may be any of an ink-jet method, an electronic-photographic method, and a thermal method, for example. The recording medium is not limited to the print tape and may be any of a plain paper sheet, a postcard, and a card, for example. The recording medium may have any size and may be formed of any material.

As illustrated in FIG. 1, the label writer 2 includes a controller 20, a print head 21, a conveyor 22, a communication interface 23, and an operation interface 24. The controller 20 includes a CPU and a memory and controls devices of the label writer 2. It is noted that each of the controller 10 and the controller 20 in FIG. 1 is not limited to a single element (hardware) actually provided and may be constituted by a plurality of elements (hardware) used for controlling a corresponding one of the information processing apparatus 1 and the label writer 2.

The print head 21 includes a plurality of print pins as heating elements for printing an image on the print tape. The print head 21 is a one example of a recording device. The conveyor 22 conveys the print tape as the recording medium. The communication interface 23 includes hardware for communication with the information processing apparatus 1. The operation interface 24 is, for example, a touch screen that accepts an input from the user and displays information. It is noted that the label writer 2 may further include a camera and a configuration for cutting the print tape, for example. The operation interface 24 may be removed.

There will be next described the image editing application 141. In the present embodiment, the image editing application 141 edits an image to be printed by the label writer 2, based on an instruction given by the user. When the image editing application 141 is started up in the information processing apparatus 1, the operation interface 15 displays an edit screen. The image editing application 141 accepts an instruction for adding characters, figures, and/or a two-dimensional code to the image being edited, for example.

The two-dimensional code represents information by means of a plurality of cells arranged in a rectangular region of the two-dimensional code. Examples of the two-dimensional code include a QR code, a Data Matrix, and PDF417. Each of the cells in the rectangular region indicates ON or OFF. The two-dimensional code stores information by means of arrangement of the cells. It is noted that an amount of information storable in the two-dimensional code increases with increase in the number of cells.

Figure 3A:
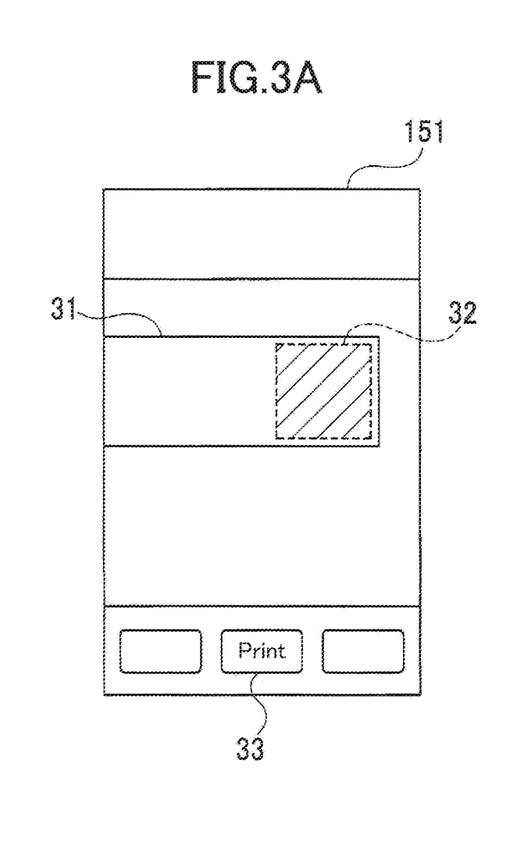
FIGS. 3A and 3B are views illustrating an example of an edit screen.

In the present embodiment, the image editing application 141 accepts an instruction for adding, to the image being edited, the two-dimensional code storing a URL such as address information on a website. In the case where an instruction for selecting a template containing the two-dimensional code or an instruction for adding the two-dimensional-code object is accepted during displaying of the edit screen, for example, as illustrated in FIG. 3A, the image editing application 141 displays an edit screen 151 containing a region for the two-dimensional code. The edit screen 151 in FIG. 3A contains: an outer-shape line 31 indicating a print tape (as one example of a recording medium); a two-dimensional-code print region 32 (as one example of a region which is set in the outer-shape line indicating the recording medium and on which the two-dimensional code is to be recorded); and a print button 33. The two-dimensional-code print region 32 is a region for printing of the two-dimensional code. The two-dimensional code has not been created on the two-dimensional-code print region 32 yet. It is noted that the image editing application 141 may provide a two-dimensional code not storing a URL by default and display the two-dimensional code on the two-dimensional-code print region 32.

Figure 3B:
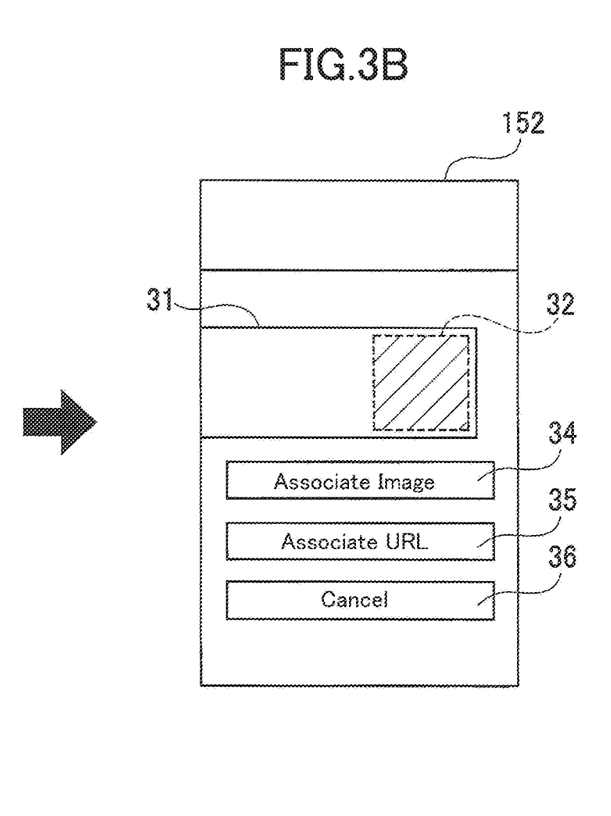

When the two-dimensional-code print region 32 is, for example, tapped, as illustrated in FIG. 3B, the image editing application 141 displays an edit screen 152 for accepting designation of information to be stored into the two-dimensional code. The edit screen 152 in FIG. 3B contains not only the outer-shape line 31 and the two-dimensional-code print region 32 but also an "Associate Image" button 34, an "Associate URL" button 35, and a "Cancel" button 36. When the "Associate Image" button 34 is tapped, the image editing application 141 accepts designation of an image file. When the "Associate URL" button 35 is tapped, the image editing application 141 accepts designation of a URL.

Figure 4A:
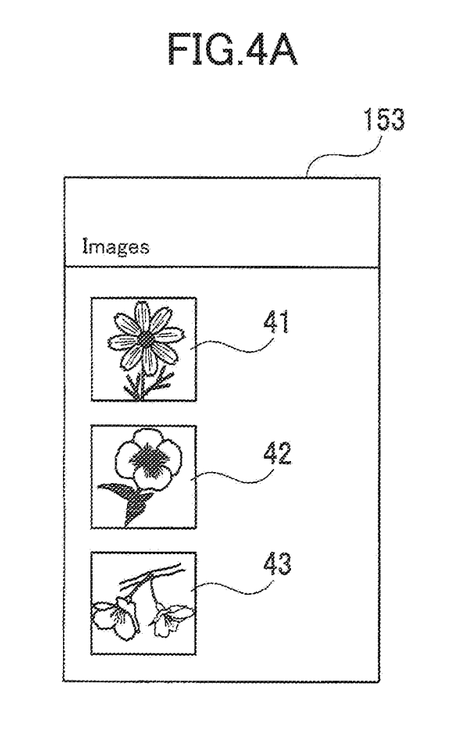
FIGS. 4A and 4B are views illustrating an example of associating an image file.

When the "Associate Image" button 34 is tapped, for example, the image editing application 141 opens a folder storing an image based on an instruction given by the user and accepts designation of an image file. As illustrated in FIG. 4A, the image editing application 141, for example, displays an edit screen 153 containing thumbnails of image files 41, 42, 43 stored in the folder. The image file is a data file storing data such as (i) a still image and a video taken by a camera of the information processing apparatus 1, (ii) a screenshot obtained by the information processing apparatus 1, and (iii) an image transmitted from another device.

Figure 4B:
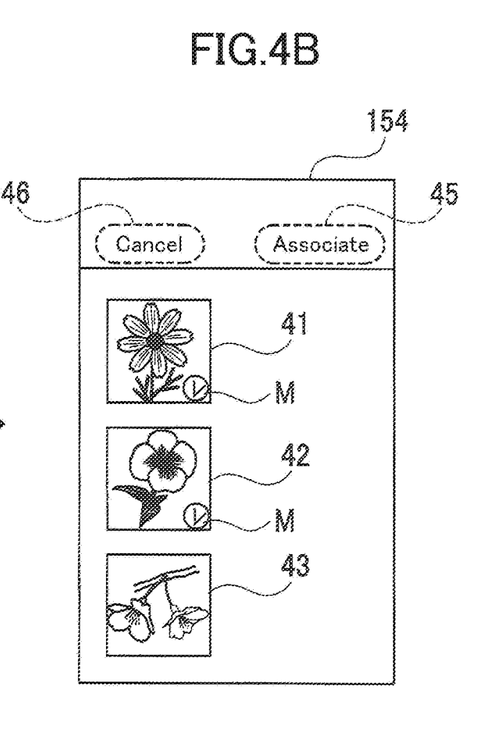

When one or more image files are selected, the image editing application 141, for example, as illustrated in FIG. 4B, check marks M indicating a selected state are combined with the respective thumbnails of the selected image files. An edit screen 154 in FIG. 4B further contains an "Associate" button 45 and a "Cancel" button 46. FIG. 4B illustrates the edit screen 154 in a state in which the image file 41 and the image file 42 (each as one example of an image corresponding to data specified by a selecting operation in an accepting processing) are being selected.

When the "Associate" button 45 (as one example of an obtainment instructing image) is tapped, the image editing application 141 connects the information processing apparatus 1 to the Internet 200 (see FIG. 2) via the communication interface 16. The image editing application 141 further uploads the image files being selected to the external server 201 (see FIG. 2) and obtains a URL as an address of a destination to which the image files are uploaded (hereinafter may be referred to as "upload destination"). That is, when the user has selected the "Associate" button 45 displayed on a display region of the operation interface 15 (as one example of a display) with the image files selected in FIG. 4B, the image editing application 141 obtains the URL corresponding to the image files being selected at this point in time. The image editing application 141 creates a two-dimensional code storing the obtained URL and displays the created two-dimensional code on the two-dimensional-code print region 32 of the edit screen 151 illustrated in FIG. 3A in combination.

The external server 201 is an upload destination set by the image editing application 141. One example of the external server 201 is Dropbox (registered trademark). The external server 201 used as an upload destination of the image files is determined based on designation performed by the user, for example. That is, the user logs in service for accepting upload of files, and the image editing application 141 uploads the image files to the external server 201 set for the service. The image editing application 141 obtains a URL as an address of the upload destination.

Figure 5A:
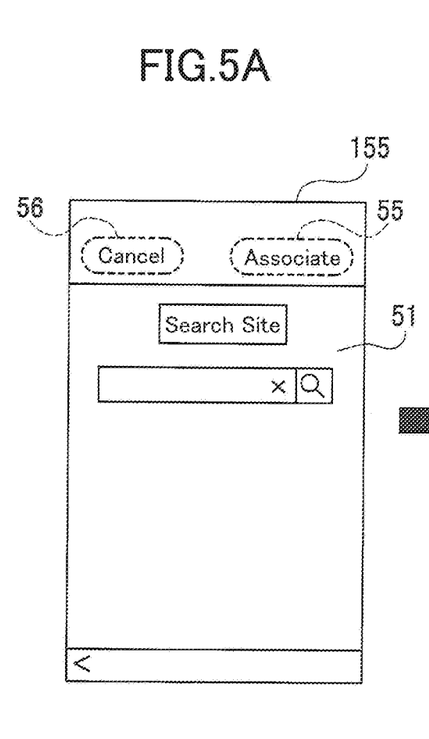
FIGS. 5A through 5C are views illustrating an example of associating a web page.
Figure 5B:
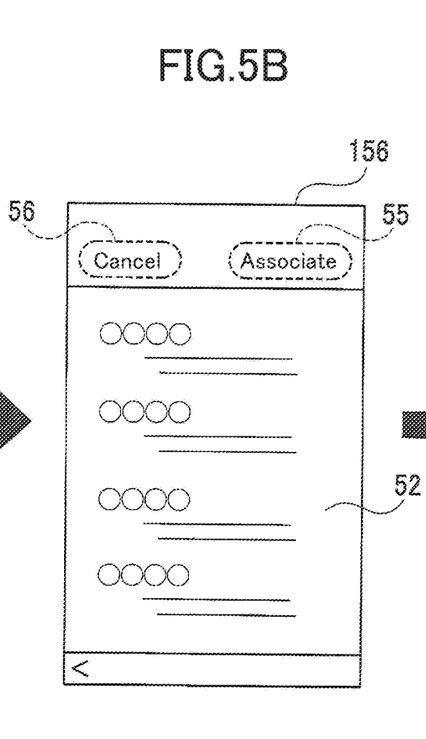
Figure 5C:
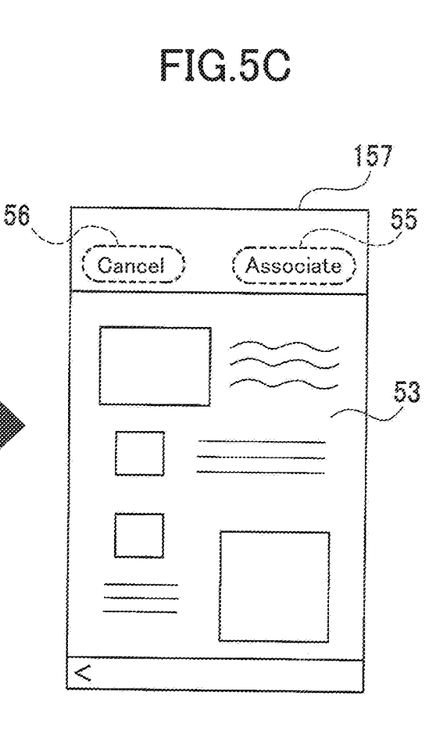

When the "Associate URL" button 35 is tapped on the edit screen 152 in FIG. 3B, the image editing application 141 starts up the browser 142 (see FIG. 1). As illustrated in FIGS. 5A-5C, the image editing application 141 displays edit screens 155-157 each containing a display screen of the browser 142, for example. It is noted that, when starting up the browser 142, the image editing application 141 instructs the browser 142 to display a predetermined search site.

When the browser 142 is started up, the information processing apparatus 1 is connected to the Internet 200 (see FIG. 2) via the communication interface 16, for example, as illustrated in FIG. 5A, the browser 142 displays a search site 51 instructed by the image editing application 141. The search site 51 is, for example, a page provided by the external server 202 (see FIG. 2) to accept an input for search service that performs a search for a web page.

When the search for the web page is performed by the external server 202 based on the input to the search site 51 and an instruction of the search, for example, as illustrated in FIG. 5B, the browser 142 displays a list 52 that is a list of links to web pages as a result of the search. When one of the links of the list 52 is tapped, for example, as illustrated in FIG. 5C, the browser 142 displays a web page 53 corresponding to the link.

Each of the edit screens 155-157 in FIGS. 5A-5C contains not only the display screen of the browser 142 but also an "Associate" button 55 (as another example of the obtainment instructing image) and a "Cancel" button 56. When the "Associate" button 55 is tapped, the image editing application 141 obtains, from the browser 142, a URL as an address of the web page being displayed. That is, when the user has selected the "Associate" button 55 displayed on a display region of the operation interface 15 (as one example of the display) with the web page selected in FIG. 5B, the image editing application 141 obtains the URL corresponding to the web page being displayed at this point in time. The image editing application 141 creates a two-dimensional code storing the obtained URL and displays the created two-dimensional code on the two-dimensional-code print region 32 of the edit screen 151 illustrated in FIG. 3A in combination. It is noted that, when the "Cancel" button 46 in FIG. 4B or the "Cancel" button 56 in FIGS. 5A-5C is tapped, the image editing application 141 displays a previous page without performing association.

The image editing application 141 accepts an instruction for checking or changing the created two-dimensional code. In the case where the tapped two-dimensional-code print region 32 contains the two-dimensional code having been already created when the two-dimensional-code print region 32 is tapped, for example, the image editing application 141 reads information stored in the two-dimensional code and determines whether the read information is a URL. When the information stored in the two-dimensional code is not the URL, the image editing application 141 determines that the tap is an instruction for creating the two-dimensional code. The image editing application 141 then accepts designation of information to be stored into the two-dimensional code as illustrated in FIG. 3B.

Figure 6A:
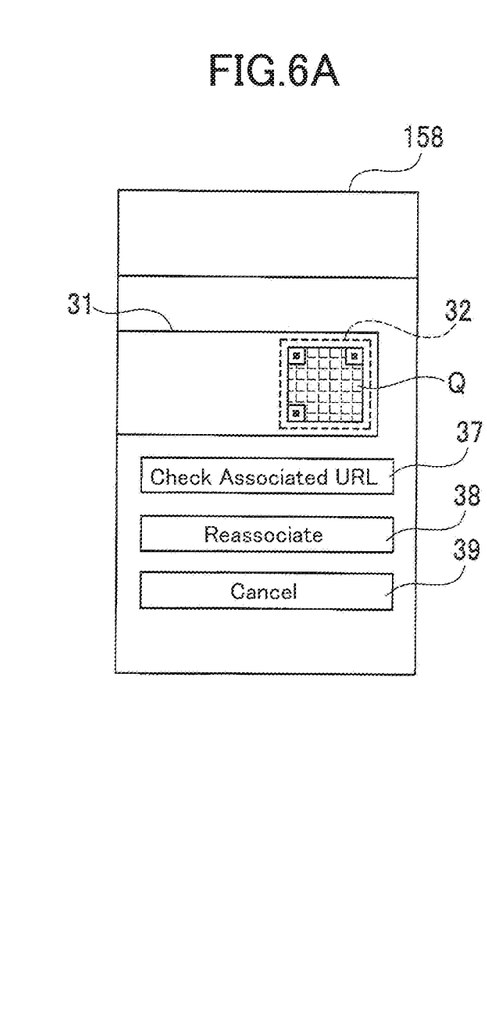
FIGS. 6A through 6C are views illustrating an example of checking or changing a two-dimensional code.

When the image editing application 141 determines that the information stored in the two-dimensional code is a URL, for example, as illustrated in FIG. 6A, the image editing application 141 displays an edit screen 158 containing a "Check Associated URL" button 37, a "Reassociate" button 38, and a "Cancel" button 39. When the "Reassociate" button 38 is tapped on the edit screen 158 in FIG. 6A, the image editing application 141 determines that the tap is an instruction for creating a new two-dimensional code. The image editing application 141 then accepts designation of information to be stored into the two-dimensional code as illustrated in FIG. 3B.

Figure 6B:
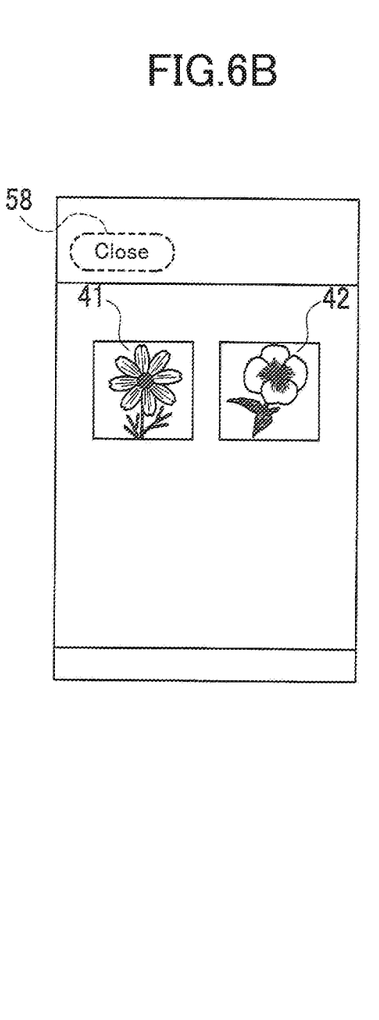
Figure 6C:
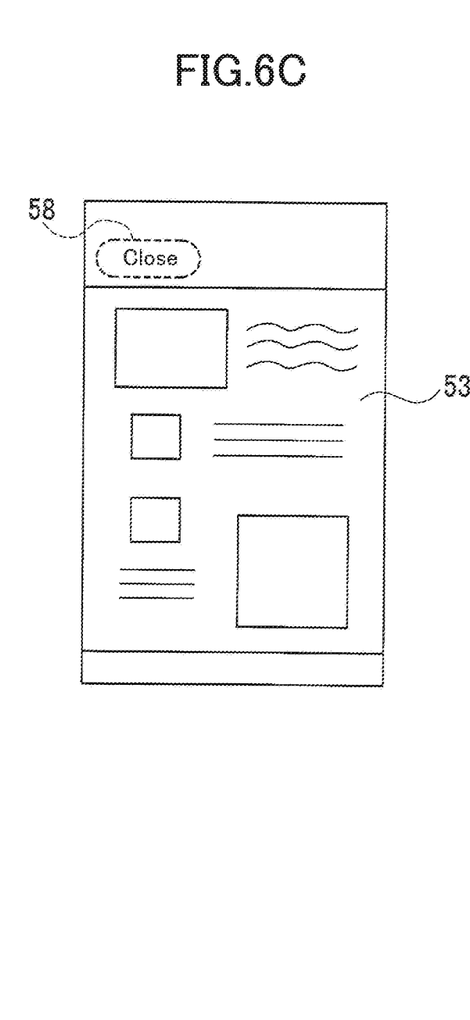

When the "Check Associated URL" button 37 is tapped on the edit screen 158 in FIG. 6A, the image editing application 141 starts up the browser 142 and instructs the browser 142 to display a page corresponding to a URL stored in a two-dimensional code Q. In the case where the URL stored in the two-dimensional code Q is a URL of the destination to which the images 41, 42 are uploaded, for example, the images 41, 42 are displayed as illustrated in FIG. 6B. In the case where the URL stored in the two-dimensional code Q is a URL of the web page 53, for example, the web page 53 is displayed as illustrated in FIG. 6C. As illustrated in FIGS. 6B and 6C, the image editing application 141 also displays a "Close" button 58 for returning to the previous screen.

When the print button 33 illustrated in FIG. 3A is tapped after the completion of the creation of the two-dimensional code, the image editing application 141 creates image data for printing based on the image being edited and transmits the created image data to the label writer 2. The label writer 2 performs printing based on the received image data. As a result, a label on which the two-dimensional code is printed is created.

Figure 7:
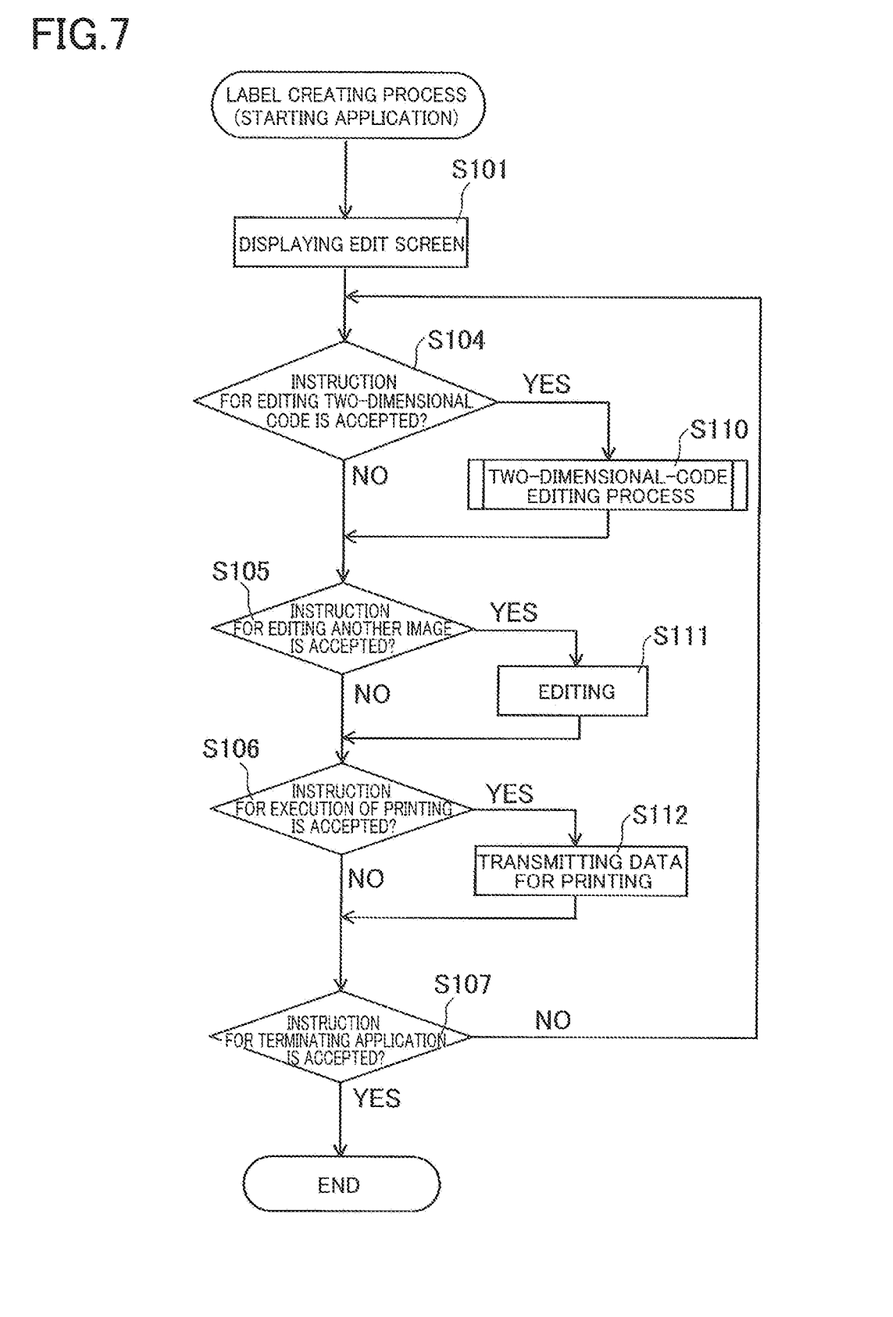
FIG. 7 is a flowchart representing a procedure of a label creating process.

There will be next described, with reference to the flowchart in FIG. 7, a procedure of a label creating process that is executed by the information processing apparatus 1 to perform the above-described two-dimensional-code creating operation in the two-dimensional-code printing system 100 according to the present embodiment. When the image editing application 141 is started up, the label creating process is executed by the CPU 11 of the information processing apparatus 1. That is, the label creating process, and a two-dimensional-code editing process and a URL obtaining process, which will be described below, are contained in the image editing application 141.

The label creating process begins with S101 at which the CPU 11 displays the edit screen 151 as illustrated in FIG. 3A, for example. The CPU 11 then accepts various instructions from the user. The CPU 11 at S104 determines whether an instruction for editing the two-dimensional code is accepted. When the CPU 11 determines that the instruction for editing the two-dimensional code is not accepted (S104: NO), the CPU 11 at S105 determines whether an instruction for editing an image different from the two-dimensional code is accepted.

When the instruction for editing the image is not accepted (S105: NO), the CPU 11 at S106 determines whether an instruction for execution of printing is accepted. When the CPU 11 determines that the instruction for execution of printing is not accepted (S106: NO), the CPU 11 at S107 determines whether an instruction for terminating the application is accepted.

When the CPU 11 determines that the instruction for terminating the application is not accepted (S107: NO), this flow returns to S104 to repeat the processings at S104-S107. It is noted that the order of the processings at S104-S107 is not limited to this order and may be a different order. The processings at S104-S107 may be executed in parallel. Also, another or other instructions may be accepted.

In the case where the two-dimensional-code print region 32 illustrated in FIG. 3A is tapped, or the instruction for adding the two-dimensional-code object is accepted as described above, for example, the CPU 11 determines that the instruction for editing the two-dimensional code is accepted. When the CPU 11 determines that the instruction for editing the two-dimensional code is accepted (S104: YES), the CPU 11 at S110 executes the two-dimensional-code editing process.

Figure 8:
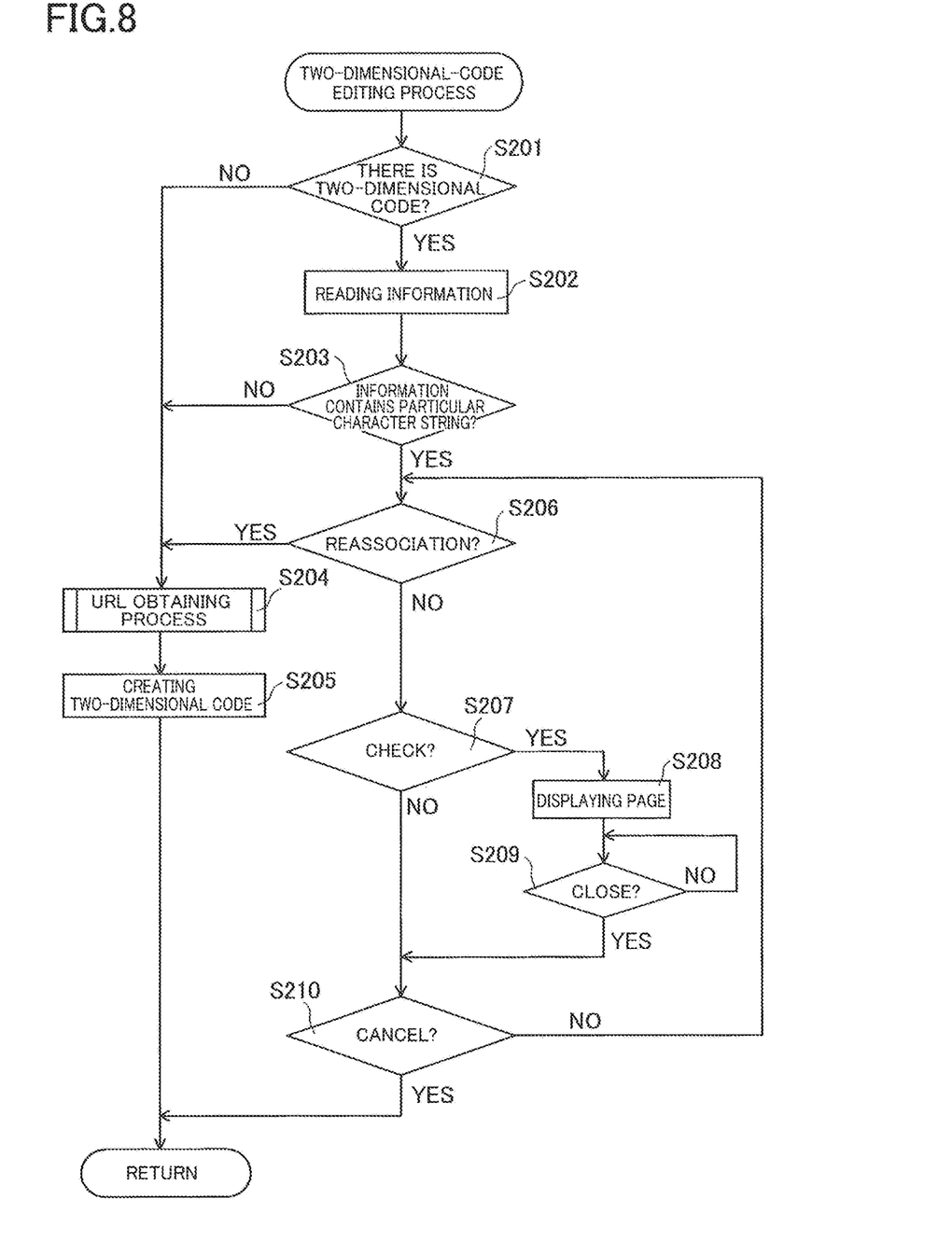
FIG. 8 is a flowchart representing a procedure of a two-dimensional-code editing process.

There will be next described a procedure of the two-dimensional-code editing process with reference to the flowchart in FIG. 8. The two-dimensional-code editing process begins with S201 at which the CPU 11 determines whether the two-dimensional code has already been provided at the designated region. When the CPU 11 determines that the two-dimensional code has already been provided at the designated region (S201: YES), the CPU 11 at S202 reads text information stored in the two-dimensional code. The CPU 11 at S203 determines whether the read text information contains a particular character string indicating a URL. One example of the particular character string is a character string which is highly likely to be contained in a URL, such as "http:".

When the CPU 11 determines that the read text information does not contain the particular character string (S203: NO) or when the CPU 11 determines that there is no two-dimensional code (S201: NO), the CPU 11 executes the URL obtaining process at S204. One example of the two-dimensional code not containing the particular character string is a sample two-dimensional code included in the template and not storing a URL. In the case where the information contained in the two-dimensional code does not include the particular character string, the image editing application 141 creates a new two-dimensional code storing the URL as in the case where there is no two-dimensional code on the two-dimensional-code print region 32.

Figure 9:
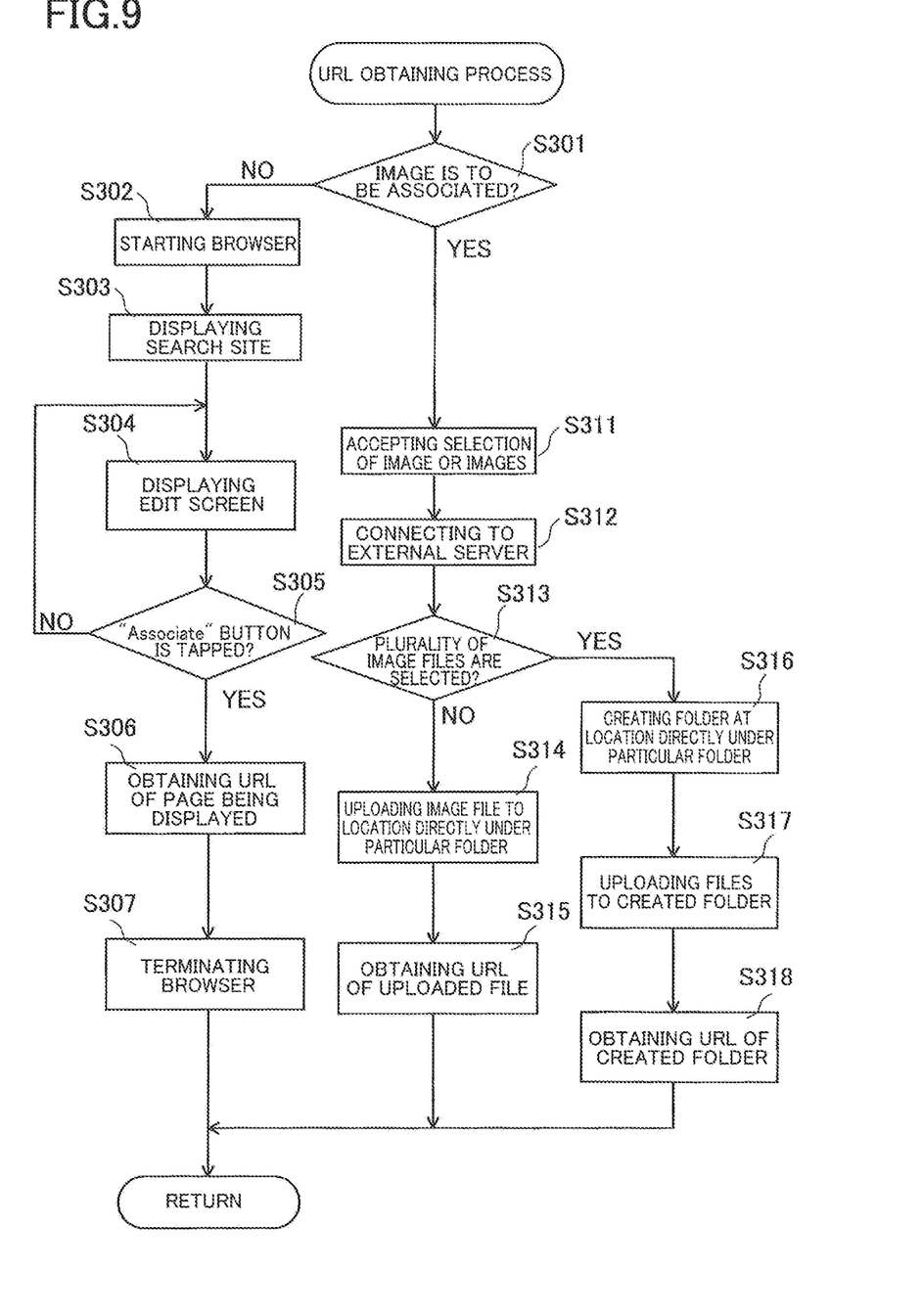
FIG. 9 is a flowchart representing a procedure of a URL obtaining process.

There will be next described a procedure of the URL obtaining process with reference to the flowchart in FIG. 9. The URL obtaining process begins with S301 at which the CPU 11 displays the screen illustrated in FIG. 3B for inquiring about whether the image file(s) or the URL is to be associated and determines whether an instruction for associating the image file(s) is accepted.

When the CPU 11 determines that not the instruction for associating the image file but an instruction for associating the URL is accepted (S301: NO), the CPU 11 starts up the browser 142 at S302 and connects the information processing apparatus 1 to the Internet 200 via the communication interface 16. The browser 142 may or may not be a default program in an operating system (OS).

The CPU 11 then controls the operation interface 15 to display the edit screen 155 including the display screen of the browser 142 as illustrated in FIG. 5A, for example. When the browser 142 is started up, the CPU 11 at S303 displays the predetermined search site 51 on the browser 142. The search site 51 may be any of an unchangeable site determined for the image editing application 141 and a site designated by the user in advance. Also, the search site 51 may be designated by the user as needed. The CPU 11 at S304 controls the operation interface 15 to display the edit screens 156, 157 including the display screen of the browser 142 as illustrated in FIGS. 5B and 5C, for example. The browser 142 displays a result of a search based on an instruction of the search by the user.

The CPU 11 at S305 determines whether the "Associate" button 55 illustrated in FIG. 5 is tapped. When the CPU 11 determines that the "Associate" button 55 is not tapped (S305: NO), the CPU 11 executes the processing at S304 until the "Associate" button 55 is tapped. The processing at S305 is one example of an accepting processing for accepting selection of the web page. The tap on the "Associate" button 55 is one example of a selecting operation for selecting the web page.

When the CPU 11 determines that the "Associate" button 55 is tapped (S305: YES), the CPU 11 at S306 obtains, from the browser 142, a URL of the web page being displayed on the browser 142. The CPU 11 terminates the browser 142 at S307, and the URL obtaining process ends. The processing at S306 is one example of an obtaining processing. Using the browser 142 enables the user to search for and select a desired web page with accustomed operations. Since the information processing apparatus 1 is capable of obtaining a URL of a selected desired web page, there is no need for the user to directly input the URL.

When the CPU 11 determines that the instruction for associating the image file is accepted (S301: YES), the CPU 11 at S311 accepts selection of the image file or files to be associated as illustrated in FIG. 4A, for example. The processing at S311 is another example of the accepting processing. The operation accepted at S311 is one example of a selecting operation for selecting the image file(s).

When the image file or files are selected, and the instruction of association is accepted, the CPU 11 at S312 connects the information processing apparatus 1 to the external server 201 that is an upload destination of the image file or files. The external server 201 only needs to be a device on the network which is capable of storing image files. One example of the external server 201 is an online storage such as Dropbox.

The CPU 11 at S313 determines whether a plurality of image files are selected at S311. When the CPU 11 determines that only one image file is selected at S311 (S313: NO), the CPU 11 at S314 uploads the selected image file to a location directly under a particular folder. The particular folder may be any of a folder designated by the user and a folder set for the image editing application 141.

It is noted that the CPU 11 at S314 changes the authority of access to the uploaded image file, to a shared setting. The shared setting is a setting which gives access authority to a plurality of users. For example, the shared setting may permit access for a large number of unspecified users and may permit access for a plurality of users belonging to a particular group.

In the case where the access authority is set for only the user having performed the upload, when accessing to the image file on the upload destination, users different from the user having performed the upload need to perform a login operation using an account of the user having performed the upload. That is, the users need to know the account of the user having performed the upload, which increases the number of operations of the user in the case where the two-dimensional code is read. Since the access authority is set for the image file to be uploaded so as to permit a plurality of users to access to the image file, even the users different from the user having performed the upload can access to the image file without the need to perform operations including a login operation, resulting in increased usability for the user having performed a reading operation of the two-dimensional code.

The CPU 11 at S315 obtains the URL of the uploaded image file, and the URL obtaining process ends. The processing at S315 is another example of the obtaining processing. When the user selects a desired image file, the image editing application 141 uploads the selected image file to the predetermined external server 201 and obtains the URL corresponding to the upload destination. This configuration enables the user to designate the URL with accustomed operations without the need to store and input the URL.

When the CPU 11 determines that a plurality of the image files are selected at S313 (S313: YES), the CPU 11 at S316 creates a folder at a location directly under the particular folder. The CPU 11 at S317 uploads the image files to the created folder. In this case, as in the processing at S314, the authority of access to each of the uploaded image files is set to a shared setting. The CPU 11 at S318 obtains the URL of the created folder, and the URL obtaining process ends. The processing at S318 is yet another example of the obtaining processing.

When the two-dimensional code storing the URL obtained at S318 is read, the folder to which the image files are uploaded is opened, and the list of the image files stored in the folder is displayed. In the case where there are a plurality of image files, displaying the image files is more preferable than displaying a particular image file when the two-dimensional code is read. Thus, in the case where there are a plurality of image files, the image files are collectively uploaded to one folder, and the URL of the folder is obtained, resulting in increased usability for the user having performed a reading operation of two-dimensional code.

Returning to the explanation for the two-dimensional-code editing process in FIG. 8, the CPU 11 at S205 creates a two-dimensional code storing the URL obtained in the URL obtaining process at S204. The processing at S205 is one example of a creating processing. As illustrated in FIG. 6A, the CPU 11 displays the created two-dimensional code on the two-dimensional-code print region 32 of the edit screen 158 in combination, and the two-dimensional-code editing process ends. Upon the end of the two-dimensional-code editing process, this flow returns to the label creating process.

When the CPU 11 at S203 determines that the two-dimensional code contains the particular character string (S203: YES), the CPU 11 accepts an instruction for checking the URL or performing reassociation as illustrated in FIG. 6A. The CPU 11 at S206 determines whether the instruction for reassociation is accepted. When the "Reassociate" button 38 is tapped, the CPU 11 determines that the instruction for reassociation is accepted (S206: YES). In this case, the CPU 11 executes the URL obtaining process at S204. The instruction for reassociation is one example of an instruction for editing an already-existing two-dimensional code.

When the CPU 11 determines that the instruction for reassociation is not accepted (S206: NO), the CPU 11 at S207 determines whether an instruction for check is accepted. When the CPU 11 determines that the instruction for check is accepted (S207: YES), the CPU 11 at S208 starts up the browser 142 to display a page corresponding to the URL to be checked, on the browser 142. Thus, when the already-existing two-dimensional code is operated, the CPU 11 inquires about whether the URL is to be checked, and when the URL is to be checked, data associated with the URL is displayed without executing proces sings including the obtaining processing for obtaining the URL, whereby the information processing apparatus 1 has a function for the user to check the already-existing two-dimensional code.

The CPU 11 at S209 determines whether the "Close" button 58 illustrated in FIGS. 6B and 6C is tapped. When the CPU 11 determines that the "Close" button 58 is not tapped (S209: NO), the CPU 11 repeats this processing. When the CPU 11 determines that the "Close" button 58 is tapped (S209: YES) or when the CPU 11 determines that neither the instruction for reassociation nor the instruction for check is accepted (S207: NO), the CPU 11 at S210 determines whether an instruction for cancel is accepted.

When the CPU 11 determines that the instruction for cancel is not accepted (S210: NO), this flow returns to S206, and the CPU 11 accepts reassociation, check, and cancel. When the CPU 11 determines that the instruction for cancel is accepted (S210: YES), the two-dimensional-code editing process ends, and this flow returns to the label creating process.

Returning to the explanation for the label creating process in FIG. 7, after the completion of the two-dimensional-code editing process at S110, the CPU 11 repeats the processings at S104-S107.

When the CPU 11 at S105 determines that the instruction for editing the image to be printed, different from the instruction for editing the two-dimensional code, is accepted (S105: YES), the CPU 11 at S111 edits and displays image data based on the instruction and repeats the processings at S104-S107.

When the CPU 11 at S106 determines that the instruction for execution of printing is accepted (S106: YES), the CPU 11 at S112 creates data for printing based on the image data being edited and controls the communication interface 16 to transmit the created data to the label writer 2. The CPU 11 thereafter repeats the processings at S104-S107.

It is noted that, in the case where the label writer 2 is not ready, such as a case where the power source of the label writer 2 is OFF and a case where the label writer 2 is not usable due to an error, the CPU 11, before the processing at S112, preferably displays a message for prompting the user to make the label writer 2 usable. At the initial startup of the image editing application 141 or in the case where the printer is not selected, the CPU 11 may search for the usable label writer 2 via the communication interface 16 before the processing at S101, for example.

When the CPU 11 determines that the instruction for terminating the application is accepted (S107: YES), the label creating process ends.

In the two-dimensional-code printing system 100 as described above, when creating the two-dimensional code, the information processing apparatus 1 instructs the user to select the web page or the image file(s) and obtains the URL corresponding to the selected web page or image file(s). The user only needs to select the web page or the image file(s) to be referred to the URL and does not need to directly input the URL. This configuration reduces the number operations of the user and reduces erroneous entry of the URL by the user.

While the embodiment has been described above, it is to be understood that the disclosure is not limited to the details of the illustrated embodiment, but may be embodied with various changes and modifications, which may occur to those skilled in the art, without departing from the spirit and scope of the disclosure. For example, each of the information processing apparatus 1 and the label writer 2 constitut-ing the two-dimensional-code printing system 100 is not limited to a single device, and a plurality of the information processing apparatuses 1 and a plurality of the label writers 2 may be provided. The expression of each button is one example and may be any expression as long as the expression indicates selection appropriately.

While the image editing application 141 obtains the URL corresponding to any of the web page and the image file(s) in the above-described embodiment, the image editing application 141 may obtain the URL corresponding to only one of the web page and the image file(s). That is, the image editing application 141 may create, from the web page being displayed, the two-dimensional code storing the URL of the web page and may accept selection of the image file or files to create the two-dimensional code storing the URL of the upload destination to which the image file or files are uploaded.

While the CPU 11 associates the image file or files in the above-described embodiment, data to be associated is not limited to the image files and only needs to be data files recognizable as files by the image editing application 141. Examples of the data files include: video files, voice files, document files containing a document, figures, and the like, and executable files for various application programs. In the case of the document file, for example, a thumbnail of a first page of the document file or a file name is preferably displayed instead of the thumbnail of the image file illustrated in FIGS. 4A and 4B. It is noted that, also in the case of the image file, a file name may be displayed with the thumbnail.

In the above-described embodiment, the information processing apparatus 1 accepts an instruction for creating the two-dimensional code after the startup of the image editing application 141. However, in the case where the image editing application 141 is started up in a state in which the image file is received from the OS, the information processing apparatus 1 may determine that an instruction for creating a two-dimensional code associated with the image file is received. That is, when starting up the image editing application 141, the image file to be associated may have been already selected. In this case, the image editing application 141 uploads the image file after the startup and obtains a URL of an upload destination of the image file. The image editing application 141 creates a two-dimensional code for storing the obtained URL and displays an edit screen containing the created two-dimensional code.

In the case where a plurality of files are selected, a folder is created in the above-described embodiment but may not be created. For example, in the case where all the files are uploaded to a particular folder, and an instruction for check is accepted, the files may be displayed one by one.

The authority of access to the uploaded file is set to the shared setting in the above-described embodiment but may not be set to the shared setting. The information processing apparatus 1 may accept user's designation of whether the access authority is set to the shared setting.

In the case where an instruction for associating the web page is accepted, when the browser 142 is started up, display of the search site 51 is instructed in the above-described embodiment, but display of the search site 51 may not be instructed. In this case, the browser 142 displays a web page set as a default. In the case where the search site 51 is displayed when the browser 142 is started up, the user does not need to display the search site.

While the image editing application 141 in the above-described embodiment accepts a print instruction, the present disclosure is applicable to an application that only creates a two-dimensional code without accepting a print instruction. For example, the present disclosure is applicable to a plug-in application that creates image data including a two-dimensional code such as a QR code and transmits the created image data to another application for printing. Also, in the case where a mailer having a function of attaching a two-dimensional code to a mail has accepted an instruction for attaching a two-dimensional code, the two-dimensional code may be created using the technique according to the present disclosure, for example.

The processings in the above-described embodiment may be executed by hardware such as a single CPU, a plurality of CPUs, and an ASIC or combination thereof. Also, the processings in the above-described embodiment may be executed in various forms such as a non-transitory storage medium storing instructions for executing the processings and methods for executing the processings.

What is claimed is:

1. A non-transitory storage medium storing a plurality of instructions readable by a computer of an information processing apparatus, the information processing apparatus comprising: a display; an accepter configured to accept an operation of a user; and a communication interface configured to be connected to a network, wherein when executed by the computer, the plurality of instructions cause the information processing apparatus to perform:

when the accepter of the information processing apparatus has accepted an instruction for creating a two-dimensional code storing a URL (uniform resource locator) of a web page, executing a first display processing in which the information processing apparatus controls the display to display a first screen in which (i) a web page and (ii) a web page two dimensional code creation instructing image for instructing the information processing apparatus to create a two-dimensional code storing a URL of a currently displayed web page are displayed together on the display;

when the accepter of the information processing apparatus has accepted an instruction to the web page two dimensional code creation instructing image, executing a second display processing in which the information processing apparatus obtains the URL corresponding to the web page that is being displayed on the display at a time when the instruction to the web page two dimensional code creation instructing image is provided and controls the display to display a second screen in which (i) a two-dimensional code storing the obtained URL and (ii) a web page display instructing image for displaying the web page stored by the two dimensional code are displayed together; and when the accepter of the information processing apparatus has accepted an instruction to the web page display instructing image, executing a third display processing in which the information processing apparatus controls the display to display a third screen in which the web page stored by the two dimensional code is displayed.

2. The non-transitory storage medium according to claim 1, wherein, when executed by the computer, the plurality of instructions cause the information processing apparatus to execute the first display processing and the second display processing in a case where the information processing apparatus accepts, via the accepter, an instruction for creating a new two-dimensional code.

3. The non-transitory storage medium according to claim 2, wherein the display is configured to display a two-dimensional-code printing region that is defined in an outer-shape line of a printing medium and that is a region on which the two-dimensional code is to be printed, and wherein the information processing apparatus is configured to determine that the instruction for creating the new two-dimensional code is accepted, in a case where the two-dimensional-code printing region is selected in a state in which text information indicated by the two-dimensional code located in the two-dimensional-code printing region does not contain a particular character string indicating a URL.

4. The non-transitory storage medium according to claim 1, wherein, when executed by the computer, the plurality of instructions cause the information processing apparatus to execute the first display processing, and the second display processing in a case where the information processing apparatus accepts, via the accepter, an instruction for editing an already-existing two-dimensional code.

5. The non-transitory storage medium according to claim 4, wherein the display is configured to display a two-dimensional-code printing region that is defined in an outer-shape line of a printing medium and that is a region on which the two-dimensional code is to be printed, and wherein the information processing apparatus is configured to determine that an instruction for editing the already-existing two-dimensional code is accepted, in a case where the two-dimensional-code printing region is selected in a state in which text information indicated by the two-dimensional code located in the two-dimensional-code printing region contains a particular character string indicating a URL.

6. A two-dimensional-code printing system comprising an information processing apparatus and an image printing apparatus, wherein the information processing apparatus comprises a controller configured to control the information processing apparatus to perform:

when an instruction for creating a two-dimensional code storing a URL (uniform resource locator) of a web page is accepted, executing a first display processing in which the controller controls a display of the information processing apparatus to display a first screen in which (i) a web page and (ii) a web page two dimensional code creation instructing image for instructing the information processing apparatus to create a two-dimensional code storing a URL of a currently-displayed web page are displayed together on the display;

when an accepter of the information processing apparatus has accepted an instruction to the web page two dimensional code creation instructing image, executing a second display processing in which the controller obtains a URL corresponding to the web page that is being displayed at a time when the instruction to the web page two dimensional code creation instruction image is provided and controls the display to display a second screen in which (i) a two dimensional code storing the obtained URL and (ii) a web page display instructing image for displaying the web page stored by the two dimensional code are displayed together; and when the accepter of the information processing apparatus has accepted an instruction to the web page display instructing image, executing a third display processing in which the information processing apparatus controls the display to display a third screen in which the web page stored by the two dimensional code are displayed, and wherein the image printing apparatus comprises a printing device configured to print, on a printing medium, an image comprising the two-dimensional code created by the information processing apparatus.

\* \* \* \* \*